United States Patent [19]

Cargould

[11] Patent Number: 4,846,334

[45] Date of Patent: Jul. 11, 1989

[54] CONVEYOR FOR TIRE UNIFORMITY MEASUREMENT MACHINE

[75] Inventor: Barry D. Cargould, Akron, Ohio

[73] Assignee: Eagle-Picher Industries, Inc., Cincinnati, Ohio

[21] Appl. No.: 162,218

[22] Filed: Feb. 29, 1988

[51] Int. Cl.$^4$ ............................................. B65G 47/00
[52] U.S. Cl. ................................ 198/346.2; 198/782; 209/538; 73/146
[58] Field of Search .................. 198/346.1, 346.2, 782; 209/538; 73/146

[56] References Cited

U.S. PATENT DOCUMENTS

| | | | |
|---|---|---|---|
| 3,848,725 | 11/1974 | Toby | 198/782 |
| 4,004,693 | 1/1977 | Tsuji et al. | 209/538 |
| 4,336,438 | 6/1982 | Vehara et al. | 198/346.2 |
| 4,488,430 | 12/1984 | Fujimoto et al. | |
| 4,685,551 | 8/1987 | Ono et al. | 198/346.2 |

*Primary Examiner*—Joseph E. Valenza
*Attorney, Agent, or Firm*—Wood, Herron & Evans

[57] ABSTRACT

A tire uniformity measurement machine has an upper rim and a lower vertically-movable rim. A conveyor to bring tires into and out of the machine consists of movable rollers having an opening in the center of the conveyor through which a vertically-movable rim passes to engage and lift a tire up to the upper rim.

6 Claims, 3 Drawing Sheets

CONVEYOR FOR TIRE UNIFORMITY MEASUREMENT MACHINE

BACKGROUND OF THE INVENTION

This invention relates to a conveyor, and more particularly, to a roller conveyor for a tire uniformity measurement machine.

A tire uniformity measurement machine has an upper rim and a vertically-movable lower rim adapted to engage and lift a tire up to the upper rim where it is held and inflated. A load wheel is movable into engagement with the inflated tire the tire is rotated at a predetermined speed, during which forces indicative of lack of uniformity are measured. Tires must be conveyed into the machine, stopped, centered prior to engagement by the lower rim and thereafter conveyed out of the machine.

In machines that existed prior to the present invention, the conveyor has entrance and exit rollers with a space between them of sufficient dimension to permit the passage of the largest lower rim to be employed in the machine. In that gap are diametrically-opposed sets of three partial rollers, the ends of the partial rollers, when spread apart, defining the largest opening between which the largest lower rim will pass. Each tire having a different size of bead defining its opening will have a mating set of rims adapted to be mounted in the machine. Therefore, the conveyor must be able to accommodate various diameters of tire rims. The rollers are mounted on carriages which are movable toward and away from each other to vary the size of the opening so as to provide the smallest possible opening adapted to permit the passage of the smallest rim and the largest opening for passage of the largest rim.

All but the center roller are driven by a sprocket and chain system. The three partial rollers are mounted on short shafts and are keyed to the shafts so as to be movable in an axial direction. The rollers, that are mounted on and driven by the shafts, have ends fixed to a transversely slidable carriage on each side of the machine. The center roller is not driven because it is not long enough to be supported on a driving shaft.

The conveyor thus described presents a problem. It does not always reliably convey a tire out of the machine after the measurement process has been performed. The tire tends to tilt as it starts its movement out of the opening through which the tire rim has passed and thus has to be driven "uphill" with the possibility of hanging up on the ends of the partial rollers.

SUMMARY OF THE INVENTION

An objective of the present invention has been to provide a conveyor that reliably conveys the tires out of the machine without tilting or hang-up.

Another objective of the invention has been to provide an improved changeover adjustment for the carriage that supports the partial rollers around the central opening of the machine.

The foregoing objectives are attained by providing the following changes in the existing machine:

(1) Four, rather than three, partial rollers are mounted on each side of the opening through which the lower rim passes.

(2) All partial rollers are driven.

(3) The ends of the rollers are driven as well as being supported on the carriage.

(4) The partial rollers define an arc whose radius is substantially equal to that of the smallest rim passing through it.

(5) The carriages have a screw and nut drive connection whereby the rotation of a crank alters the spacing between the two carriages and, hence, the spacing between the partial rollers.

The combination of the four partial rollers and the smaller radius defined by the roller ends provide assurance that every tire, regardless of the diameter of its support locus is supported on at least three points that define a triangle with the center of gravity of the tire being always within the confines of the triangle. The support locus is the circle of the side wall at the maximum transverse dimension of the tire. It is the support locus that engages the rollers, providing substantially a point contact with the rollers as the tire is conveyed through the machine.

Through the use of four partial rollers, the shortest of the rollers is still long enough to permit all rollers to be driven.

The ends of the rollers are supported on the movable carriage but are driven by a stationary drive. By providing for the driven rotation of the ends of the rollers, the possibility of hang-up on the rollers is eliminated.

BRIEF DESCRIPTION OF THE DRAWINGS

The several features and objectives of the present invention will become more readily apparent from the following detailed description taken in conjunction with the accompanying drawings in which.

DETAILED DESCRIPTION

Figure 1:
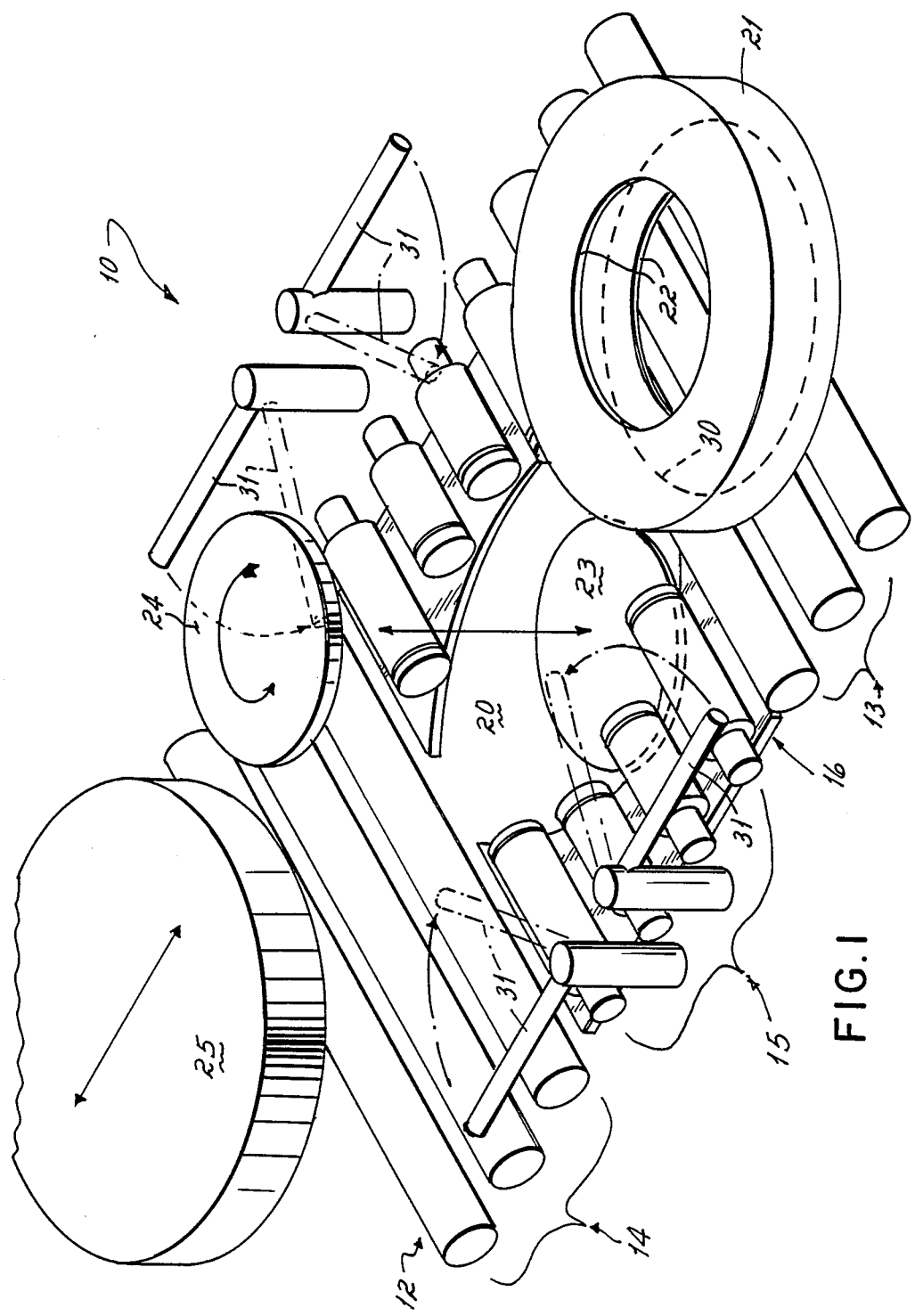
FIG. 1 is a diagrammatic perspective view of the tire uniformity measurement machine.

The tire uniformity measurement machine is diagrammatically illustrated at 10. It has a conveyor 12 that includes entrance rollers 13 and exit rollers 14 that are longitudinally-spaced apart. Partial rollers 15 are mounted on carriages 16 that move the partial rollers toward and away from each other, thereby changing the size of an opening 20 defined by the ends of the rollers. The function of the rollers is to convey a tire 21 to a position over the opening. The tire 21 has a bead 22 whose diameter will vary with different sizes of tires. The bead is engageable by a vertically-movable lower rim 23 and an upper rim 24 whose diameters must be varied with changes in bead diameter. A load wheel 25 is mounted adjacent to the upper rim and is adapted to move into engagement with the tire and is rotatable at which time sensors detect variations in the uniformity of the tire.

The tire has a support locus 30 that is a circle defined by the diameter of the largest dimension through a cross section of the tire. It is the portion of the tire that rests on the rollers as the rollers convey the tire through the measurement machine.

Four centering arms 31 are pivotally-mounted above the rollers. After the conveyor stops the tire at approximately a centered position between the rims, the four arms swing out to engage and move the tire to a final centered position before the lower rim moves upwardly to engage and lift the tire up to the upper rim.

In the operation of the machine, the tire is conveyed to a position approximately centered over the opening 20. Photosensors cause the conveyor to stop the tire in that position. The four pivoted arms 31 swing into engagement with the tread of the tire and effect the final precise centering of the tire between the lower and upper rims 23, 24. The lower rim engages the lower bead 22 of the tire and lifts the tire into engagement with the upper rim 24. In this position, with the rims in snug contact with the beads, the tire is inflated. The load wheel 25 moves into engagement and drives the tire until the uniformity measurement is completed. The load wheel backs away and the lower rim drops, carrying the tire down onto the conveyor 12. All rollers are rotated and the tire is conveyed away while conveying in the next incoming tire.

Figure 2:
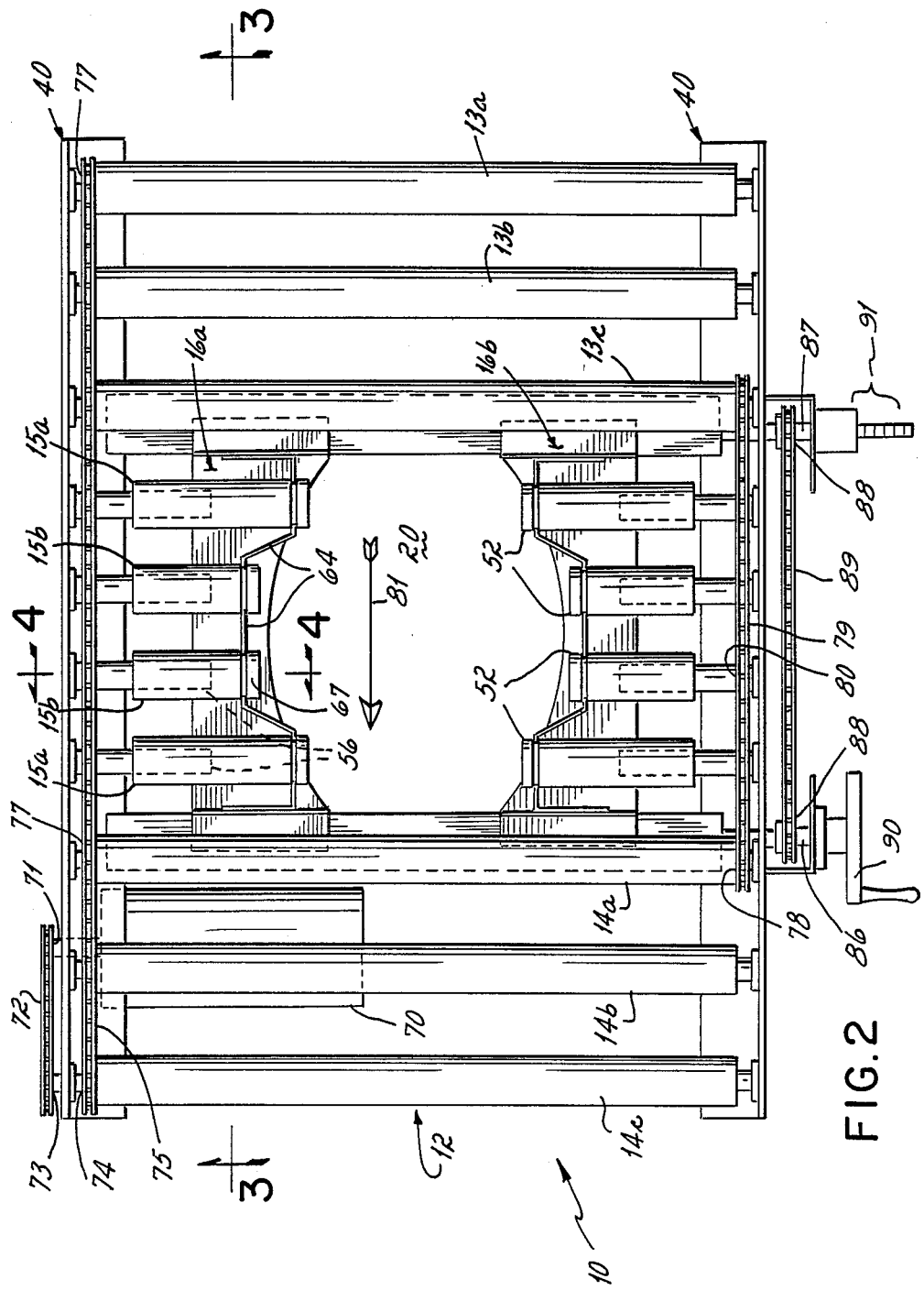
FIG. 2 is a top plan view of the machine.
Figure 3:
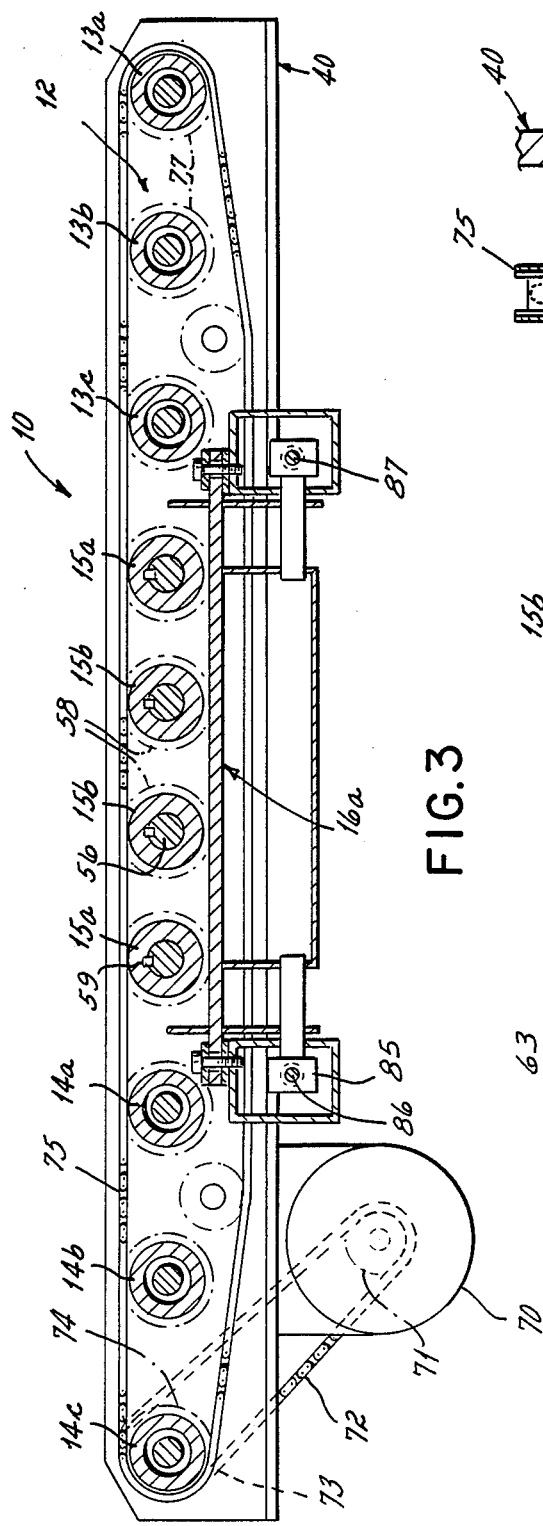
FIG. 3 is a cross-sectional view taken along lines 3—3 of FIG. 2.
Figure 4:
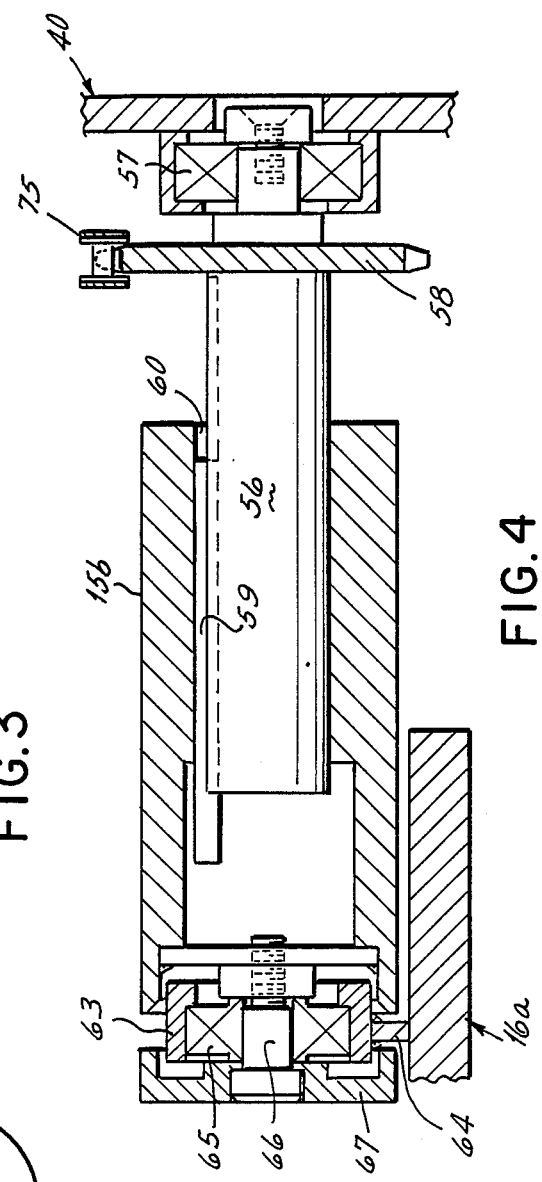
FIG. 4 is a cross-sectional view taken along lines 4—4 of FIG. 2.

Referring to FIGS. 2 to 4, the conveyor has a frame 40 that rotatably supports three entrance rollers 13a, 13b and 13c and three exit rollers 14a, 14b and 14c. Between the inboard rollers 13c and 14a is a space large enough to permit the vertical passage of the largest rim to be used in the machine. Within that space are two carriage halves 16a and 16b that are slidably mounted with respect to the frame. Each carriage carries four partial rollers consisting of large outboard rollers 15a and short inboard rollers 15b. The rollers have end points 52 that define a circle that is approximately the diameter of the smallest rim to pass through the opening 20 defined by the end points 52 of the opposed partial rollers.

Referring to FIG. 4, it can be seen that each partial roller is supported on a carriage roller shaft 56 that is rotatably-mounted by means of a bearing 57 to the frame 40. The shaft has a sprocket 58 by which it is driven. It has a key 59 that rides in a keyway 60 in the roller 15a, 15b to permit the roller to slide with respect to the shaft 56. The outer end of each roller has an outer bearing race 63 that is fixed to a bracket 64 mounted on the carriage halves 16a, 16b. The race is part of a bearing 65 that supports a shaft 66 fixed to the roller 15a, 15b. The shaft supports an end piece 67 that rotates with the roller 15a, 15b. Thus, the end of the roller is supported against the weight of the tires that will be conveyed on it but nevertheless is rotatable at its end to eliminate a hang-up point preventing the driving of the tire out of the machine.

A gear motor 70 (FIGS. 2 and 3) drives all rollers. The motor has a sprocket 71 on its drive shaft. The sprocket is connected by a chain 72 to sprocket 73 on roller 14c. Roller 14c has another sprocket 74 that is connected by a chain 75 to sprockets 77 on rollers on the motor side of the machine. The partial rollers on the side of the machine remote from the motor 70 are driven as follows: inboard exit roller 14a has a sprocket 78 on the side remote from the motor 70. That sprocket is connected by a chain 79 to the four sprockets 80 of the partial rollers on the side of the machinery remote from the motor. Thus, through the operation of the motor, all rollers are driven simultaneously to carry a tire to a position between the rims 23, 24. A photosensor, not shown, detects the tire position, and when it is generally centered over the opening 20, the rollers stop. Thereafter, the arms 31, (FIG. 1) move against the tire tread to effect the final and precise centering of the tire between the rims.

When the uniformity measuring process is completed and the tire is returned to the conveyor, the motor is, once again, energized to drive all rollers simultaneously to remove the tire, the tire moving in the direction of the arrow 81 in FIG. 2.

Each carriage half 16a, 16b has a pair of nut assemblies 85. A drive screw 86 passes through opposed pairs of nut assemblies and respective carriage halves 16a, 16b and similarly a slave screw 87 passes through the remaining pair of nut assemblies. The drive and slave screws have sprockets 88 and a chain 89 that ties them together. The drive screw 86 has a crank 90 by which it can be rotated to rotate both screws and to carry the carriages toward and away from each other during a changeover from one rim to the next. An indicator pin 91 on the slave screw 87 indicates the position of the carriage halves.

In the changeover operation, the size of tire to be run through the machines is determined. Upper and lower rims are replaced with the rims that are of a size to accommodate the bead of the tire to be measured. The crank 90 is turned until the carriage opens or closes to the size just permitting the rim to pass through the opening 20. With the carriages thus positioned with respect to the rim diameter, there is always assurance that the tire, as it passes through the machine, will always be supported on the rollers at at least three contact points that define a triangle with the center of gravity of the tire being within the confines of the triangle. Thus, there is no tendency of the tire to tilt. Further, by providing for rotation of the inner ends of the partial rollers, there is no fixed points of change which would cause frictional resistance to the movement of the tire from the entrance to the exit of the machine.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A conveyor for delivering tires to a tire-testing machine wherein a lower rim will pass through a central opening in the conveyor to lift the tire to an upper rim, the conveyor comprising:
   a frame,
   lateral rollers mounted on said frame on the upstream and downstream sides of said opening,
   short rollers mounted on said frame on horizontal axes between said lateral rollers on opposite sides of said opening,
   means for driving all rollers in the same direction continuously,
   means for sliding only said short rollers toward and away from each other on said horizontal axes to contact and enlarge said opening.

2. A conveyor for delivering tires to a tire-testing machine wherein a lower rim will pass through a central opening in the conveyor to lift the tire to an upper rim, the conveyor comprising:
   a frame,
   lateral rollers mounted on said frame on the upstream and downstream sides of said opening,
   short rollers mounted on said frame on horizontal axes between said lateral rollers on opposite sides of said opening,
   means for driving all rollers in the same direction continuously,
   means for sliding only said short rollers toward and away from each other on said horizontal axes to contract and enlarge said opening, each short roller comprising:

a carriage roller shaft rotatably mounted on said frame, a carriage roller mounted on said shaft and keyed to said shaft to permit sliding movement with respect to said shaft, a carriage on each side of said opening carrying all short rollers on that side of said opening, and means for moving said carriages toward and away from each other.

3. A conveyor as in claim 1 in which said driving means comprises:

a motor, transmission means connecting said motor to one lateral roller, aligned sprockets on the rollers on both sides of said opening, chains on both sides of said openings passing over said sprockets, whereby the motor drive to one roller will be transmitted via said aligned sprockets to all rollers.

4. A conveyor for delivering tires to a tire-testing machine wherein a lower rim will pass through a central opening in the conveyor to lift the tire to an upper rim, the conveyor comprising:

a frame, lateral rollers mounted on said frame on the upstream and downstream sides of said opening, short rollers mounted on said frame on horizontal axes between said lateral rollers on opposite sides of said opening, means for driving all rollers in the same direction continuously, means for sliding only said short rollers toward and away from each other on said horizontal axes to contract and enlarge said opening, opposed carriages mounted on said frame and supporting said short rollers, each short roller having a shaft mounted on said carriage and a carriage roller keyed to and slidably-mounted on said shaft on each side of said opening, a bearing mounted on said carriage and supporting each short roller, and means for moving the carriages toward and away from each other.

5. A conveyor as in claim 4 further comprising:

a sprocket on each said shaft for rotating said shaft, said bearing being mounted intermediate the ends of said carriage roller dividing said carriage roller into two parts, and means for connecting both roller parts together so that the end of each roller is positively driven by said sprocket.

6. A conveyor as in claim 1 in which there are four short rollers on each side of said opening, the inboard rollers being shorter than the outboard rollers whereby the ends of said four rollers approximately define the arc of a circle whose radius is approximately that of the smallest tire rim to pass through the opening.

* * * * *